May 5, 1964 W. H. QUICK 3,131,903
FRANGIBLE AND RESILIENT MOUNTING SYSTEM
Filed Dec. 7, 1960 2 Sheets-Sheet 1

INVENTOR.
WILLIAM H. QUICK
BY
AGENT

May 5, 1964  W. H. QUICK  3,131,903
FRANGIBLE AND RESILIENT MOUNTING SYSTEM
Filed Dec. 7, 1960  2 Sheets-Sheet 2

INVENTOR.
WILLIAM. H. QUICK
BY
*John A. Duffy*
AGENT 3,131,903
FRANGIBLE AND RESILIENT MOUNTING SYSTEM
William H. Quick, La Mirada, Calif., assignor to North American Aviation, Inc.
Filed Dec. 7, 1960, Ser. No. 74,323
1 Claim. (Cl. 248—358)

The invention relates to mounting systems, and more particularly to a shock mounting system for maintaining mounting rigidity below a predetermined force and mounting resiliency above a predetermined force.

Precision instruments used in moving vehicles such as airplanes and submarines, often incorporate design features which require rigid mounting of the instrument to the vehicle frame. For example, an autonavigator in a submarine may be rigidly secured to the submarine hull in accordance with design criteria to provide a common reference alignment with other systems. Unfortunately, the packaging design features of the precision and often fragile components of the autonavigator are incompatible with the severe stresses encountered. Thus, in a submarine having an autonavigator rigidly attached to its hull, shock forces transmitted through the hull such as those resulting from nearby depth charges or sudden changes in course are transmitted directly through the rigid mounting to the autonavigator components. These precision components are unable to withstand the severe shock and often suffer extreme damage.

Typical mounting systems have utilized resilient shock absorbing devices such as rubber mounts and pressurized fluid mounts to absorb the shock received by a supporting frame. However, in some systems such as a precision autonavigator instrument in a submarine, the reliability of operation depends upon a rigid mounting and therefore, resilient shock absorbers are unsatisfactory. As a result, the choice in the prior art has been to either provide resilient shock mounts and protect the precision instrument at the expense of accuracy and reliability, or to provide rigid mounts leaving the instrument helpless in the face of severe shocks. Accordingly, it is an object of this invention to provide an improved shock mount system.

The system of applicant's invention provides a mounting system which combines the features of rigidity and resilience to maintain accuracy and operability during the transmission of severe shocks from the mounting frame. Simple, reliable, and highly effective structure allows a mass to be mounted to be rigidly supported by a support frame during minor shock forces and to be resiliently supported by the frame during major shock forces. In this manner, the mass is protected from severe shocks and rigidly supported during normal operation.

It is therefore another object of this invention to provide a mounting system for rigidly supporting a mass for minor shocks and resiliently supporting the mass for major shocks.

It is a further object of this invention to provide a frangible shock mount system.

It is still another object of this invention to provide a mounting system which combines the advantages of rigid and resilient mounting.

It is still a further object of this invention to provide a mounting system which is rigid up to a predetermined force, resilient above the predetermined force, and rigid again when the force falls below the predetermined force.

Other objects of the invention will become apparent from the following description taken in connection with the accompanying drawings in which.

According to a principal aspect of applicant's invention, a shock absorbing system is provided for use in mounting a device to a supporting frame. The shock absorbing system includes a combination of a frangible mount which rigidly supports the device on the frame and a resilient mount which provides mounting elasticity between the device and the frame. For shock forces below a predetermined force, the frangible mount is active rigidly supporting the device to the frame. For forces above the predetermined force, the frangible mount is shattered by the excessive force and the resilient mount becomes active resiliently supporting the device to the frame to protect the components in the device from the excessive shock. In this manner, complete protection is provided for the device.

Figure 1:
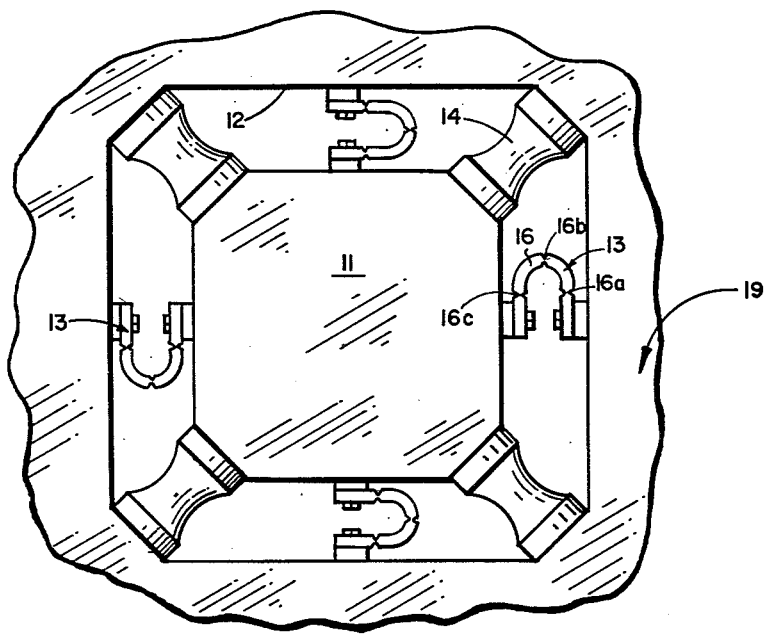
FIG. 1 is a schematic illustration in plan of a typical shock mount configuration according to the principles of the invention.

Referring now to FIG. 1, a schematic illustration in plan, there is shown a typical shock mount configuration according to the principles of the invention. In FIG. 1, a mass 11 which may be for example, a precision autonavigator is rigidly mounted to a support frame 12 by frangible shock mounts 13 and resilient shock mounts 14. Each of the frangible mounts 13 may comprise, for example, as shown in FIG. 1, a rigid element 16 having notches 16a, 16b, and 16c to facilitate breaking. The element 13 has its ends rigidly attached to the mass 11 and the frame 12. The notches 16a, 16b, and 16c are of a size so that the support 13 will fracture at a predetermined maximum desired force. Therefore, it may be seen that the mass 11 is rigidly supported to the frame 12 by the supports 13 until a breaking point force is applied to any one of the supports 13. The support 13, for example on the side 19 of the frame 12, which is subjected to the breaking force will shear at the notches 16a, 16b, and 16c. Because of the frangible character of the supports 13, when the breaking point is reached at any side, the mass 11 is no longer rigidly mounted to the frame 12 at the side where the support 13 breaks.

Resilient mounting of the mass 11 to the frame 12 occurs upon the breaking of any of the rigid mounts 13. Resilient mounting devices 14 provide an elastic support between the mass 11 and the frame 12 at any desired spring constant. Each of the resilient mounts 14 may be, for example, a rubber mount having a resiliency or elasticity as desired to withstand the total amount of force which may be expected on the mass 11. As shown in FIG. 1, four resilient mounts 14 may be utilized to mount the mass 11, which is shown in plan for illustrative purposes as having a square base to the frame 12. It is to be realized, of course, that the number of frangible mounts 13 and resilient mounts 14 shown in FIG. 1 is for illustrative purposes only. In some cases only one of each type is necessary.

Figures 2, 5, 6:
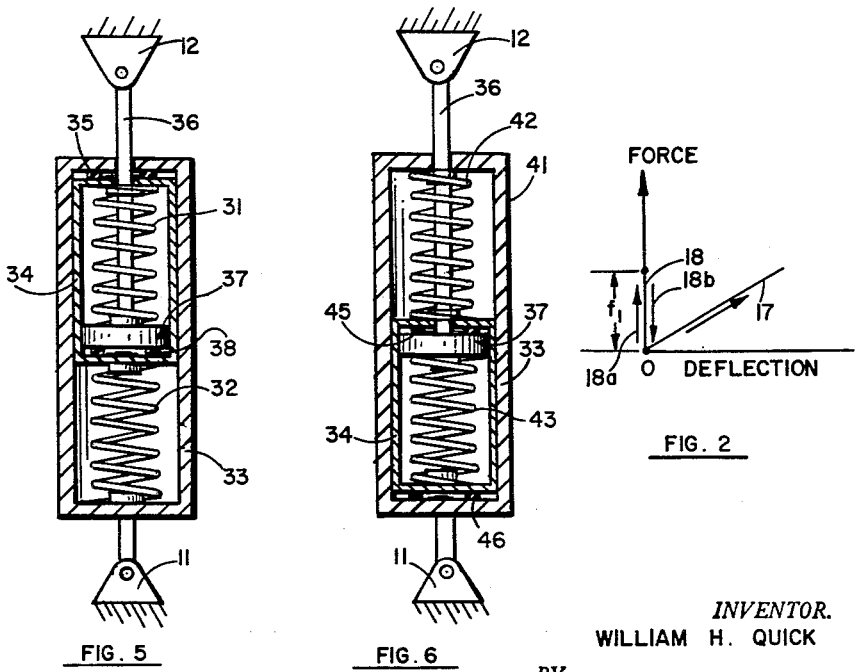
FIG. 2 is a force deflection diagram of the shock mount configuration of FIG. 1.
FIG. 5 illustrates a shock mount according to another aspect of the invention.
FIG. 6 illustrates a shock mount according to a further aspect of the invention.

Assuming now, for example, that the mass 11 in FIG. 1 is subjected to forces and referring to FIG. 2, a force deflection diagram of the device of FIG. 1, it may be seen that for a given force $f_1$ the deflection of the mass 11 is equal to zero. In other words, up until the desired force $f_1$, along the line 18 as shown by the arrow 18a, the frangible mounts 13 are rigidly supporting the mass 11 to the frame 12. For this reason, the mass 11 has a zero deflection. Upon a force exceeding the force $f_1$ in any direction one of the frangible mounts 13 breaks and the force drops to zero along the line 18 as shown by the arrow 18b. For forces exceeding $f_1$, a deflection occurs in the resilient mounts 14 as shown by the line 17. In other words, when the force $f_1$ is exceeded as shown along the line 18 in FIG. 2, one of the frangible mounts 13 has broken and a corresponding resilient mount 14 is now resiliently supporting the mass 11 to the frame 12. Therefore, for increasing forces, the deflectoin of mass 11 occurs as shown along the line 17. In this manner, the mass 11 has a zero deflection until a breaking point force $f_1$ is reached, at which time the mass has a deflection according to the elasticity of the resilient mounts and the dynamics of the system. The spring constant of the resilient mount 14 is determined by the maximum number of forced linear acceleration that might be expected and the maximum allowable linear excursion. In this manner, complete protection for the device 11 may be realized without any deflection during normal operating forces below the force $f_1$.

Figure 3:
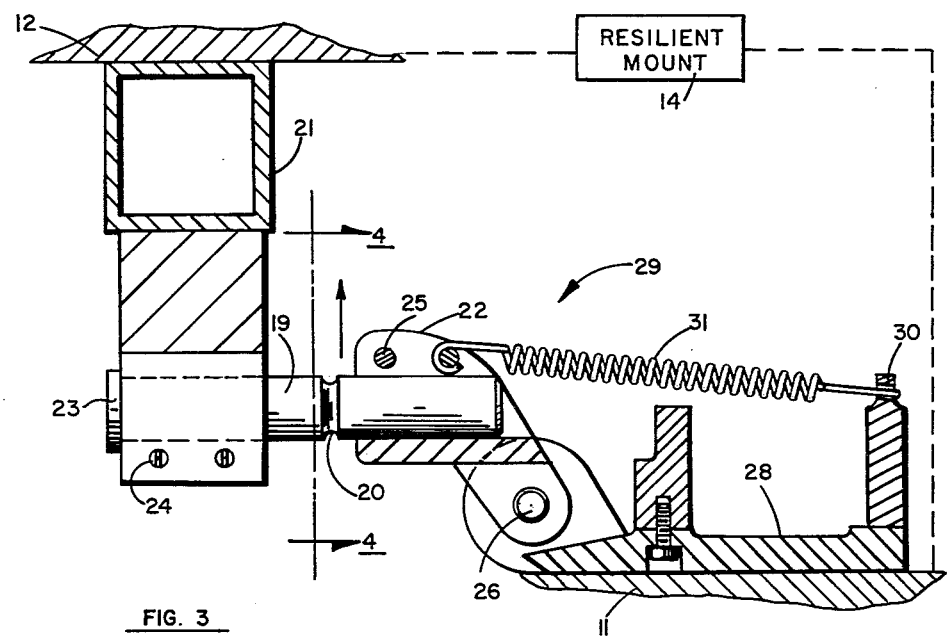
FIG. 3 is a sectional view illustrating the frangible member of a shock mount according to one aspect of the invention.

Referring now to FIG. 3, there is illustrated in sectional view a frangible element of the shock mount system according to one aspect of the invention. This frangible element may be utilized in place of element 13 in the type of arrangement shown in FIG. 1. The mass 11 is mounted to the frame 12 by a resilient shock mount 14 and a frangible shock mount 29 which includes a pin 19 having one end suitably clamped in a support assembly 21 which is rigidly secured to the supporting frame 12. A clamping assembly 22 is adapted to receive and clamp the other end of the pin 19. The pin 19 is adapted as shown, to fit through the support assembly 21 and the clamping assembly 22 having a head 23 to determine the location of the pin. Means may be provided in both the support assembly 21 and the clamping assembly 22 to tighten the pin 19 in both assemblies 21 and 22. The clamping assembly 22 is pivoted at a point 26 being secured to a suitable pivot in a link assembly 28 whcih is rigidly attached to the mass 11. The upper end of the clamping assembly 22 has attached to it one end of a spring 31 which has its other end attached to an extrusion 30 of the link assembly 28. The pin 19 is notched at a point 20 which determines the breaking point on the pin. Upon breaking of the pin 19 at the point 20, the clamping assembly 22 is pivoted about the point 26 toward the extrusion 30 by the spring force of the spring 29.

In operation of the clamp of FIG. 3, when the shock force between the support frame 12 and the mass 11 exceeds the predetermined allowable force, the pin 19 breaks at the point 20 and moves in the direction shown by the arrow. Thus, as the pin 19 breaks at the point 20, the clamping assembly 22 has a force exerted upon it by the spring 29 tending to make the clamping assembly 22 pivot about the point 26. When a force exceeding the predetermined force is reached, the pin 19 breaks and the clamping assembly 22 pivots about the point 26 being drawn toward the extrusion 30. The mass 11 would then be supported by resilient mount 14. In this manner, the pin 19 is enabled to break with the effect of other forces such as tension being minimized and with the frangible pieces removed from possible contact with each other.

Figure 4:
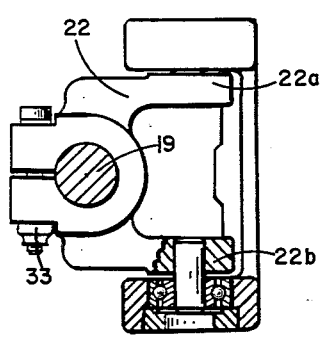
FIG. 4 is a cross-section of the frangible mount of FIG. 3 taken on the line 4—4 of FIG. 3.

In FIG. 4, a view of the frangible shock mount of FIG. 3, taken along the lines 4—4, it may be seen that the clamping assembly 22 comprises a forked clamp having branches 22a and 22b pivoting about the pivot point 26 shown in FIG. 3. The pin 19 is securely clamped by the screw assembly 25 which may be adjusted to clamp the pin as desired. To facilitate pivoting, a bearing 34 is provided to allow a shaft 35 which is utilized with the branch 22a to rotate therein upon breaking of the pin 19.

The frangible mount as shown in FIGS. 3 and 4, may readily be adapted to co-operate with a resilient mount, such as the shock mount 14 of FIG. 1, to provide a combined resilient and rigid mounting means for any device.

Referring now to FIGS. 5 and 6, there is illustrated a pair of shock mounts according to another aspect of this invention which combine the features of resiliency and rigidity. In the shock mount of FIG. 5, a pair of precompressed springs 31 and 32 are adapted to provide a combined rigid and resilient shock mount for mounting the mass 11 to the supporting frame 12. The mass 11 is rigidly attached to an outer cylinder 33. An inner cylinder 34 is adapted to move between the lower end and the upper end of the outer cylinder 33. The upper end of the outer cylinder 33 has a seat 35 for terminating the upper movement of the inner cylinder 34. The upper ends of the outer cylinder 33 and the inner cylinder 34 have openings adapted to receive a plunger 36 which has one end attached to the support frame 12 and a piston end 37 adapted to fit against a seat 38 attached to the lower end of the cylinder 34. The precompressed spring 32 has its ends adapted to push against the lower end of the outer cylinder 33 and the outside lower end of the inner cylinder 34. In compression the spring 32 tends to force the inner cylinder 34 against the seat 35. The precompressed spring 31 is placed between the piston 37 and the upper end of the inner cylinder 34. The sprnig 31 is precompressed to force the piston end 37 of the plunger 36 against the seat 38.

Figure 7:
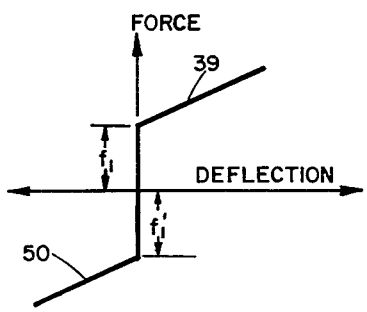
FIG. 7 is a force deflection diagram of the shock mounts of FIGS. 5 and 6.

In operation, the shock mount shown in FIG. 5 operates for tension and compression shock forces. As shown in the upper half of the force deflection diagram of FIG. 7, no deflection occurs until the force reaches the precompression spring constant of the upper spring 31 which as shown in FIG. 7, is equal to $f_1$, for example. A shock force exceeding $f_1$ causes the piston 37 to break away from the lower seat and move upward as shown in the line 39. Therefore, it may be realized that for forces lower than $f_1$, the shock mount in FIG. 6 is rigidly mounting the mass 11 to the frame 12 and for forces exceeding $f_1$ the mount is resiliently supporting the mass 11 to the frame 12.

From the force deflection diagram of FIG. 7, it may be seen that the shock mount of FIG. 5 provides a zero deflection between the mass 11 and the frame 12 for forces below $f_1$ and a deflection as indicated on the line 39 for forces above $f_1$. It is to be noted that the force does not return to zero upon shock forces reaching $f_1$ since there is no breaking of the rigid mounting provided by the springs in the device of FIG. 5. Again, when the force exerted drops below $f_1$ after having exceeded that force, the device automatically returns to its rigid mounting feature without any reset necessary.

The shock mount 41 shown in FIG. 6 is constructed similarly to the mount in FIG. 5 and is adapted to provide support for tension and compression forces. In the mount 41, an upper spring 42 is attached between the upper end of the outer cylinder 33 and the upper end of the inner cylinder 34. The piston 37 has its end 36 protruding through the upper ends of cylinders 33 and 34. A seat 45 at the upper end of inner cylinder 34 receives the piston 37 which is forced against the seat by lower spring 43 which is attached between the lower end of the cylinder 34 and the piston 37. A seat 46 at the lower end of the outer cylinder 33 supports the cylinder 34 when forced by the spring 42.

In operation of the mount of FIG. 6, illustrated by the diagram in FIG. 7, for forces below $f_1'$, for example, the spring constant of springs 42 and 43 force the piston 37 against the seat 45 and the inner cylinder 34 against the seat 46 thereby maintaining mounting rigidity. For forces exceeding $f_1'$ the deflection of the mount is shown as line 50 in FIG. 7.

Thus it may be seen, that the mounts in FIGS. 5 and 6 operate as a frangible shock mount allowing essentially no motion until a pre-established force is reached. Upon reaching of a predetermined force, the mounts act as a resilient shock mount with freedom under a controlled spring rate being permitted. Upon removal of the force, the units shown in FIG. 5 and FIG. 6 will return to their original position thereby providing an advantage in that no reset is necessary since they automatically reset.

Another advantage of the shock mounts of FIGS. 5 and 6 is that when the two seats 38 and 35 in FIG. 5, for example, are in abutment with piston 37 and the top end of cylinder 34 respectively, the length of the unit is precisely determined. The preloading provided by the springs assures that there is no backlash when the unit returns to rigid operation following resilient operation.

The shock mounts of the invention as illustrated in the embodiments therein, are particularly adapted to a shock mount system desiring rigid mounting for normal operation and resilient mounting for forces exceeding a predetermined breaking point. The breaking point force of the embodiments in FIG. 1 may be, for example, a breaking point force of five *g*'s (gravitational force) wherein when the frangible shock mount breaks at a 5–9 force the resilient rubber shock mount provides mounting.

Although the invention has been described and illustrated in detail, it is to be clearly understood that the same is by way of illustration and example only and is not to be taken by way of limitation, the spirit and scope of this invention being limited only by the terms of the appended claim.

I claim:

A shock absorbing system for use in mounting a device to a frame comprising: a frangible shock mount including a shear pin; first holding means having an upper end rigidly attached to said frame and a lower end for holding one end of said shear pin; second holding means having its upper end for holding the other end of said shear pin and its lower end pivotably attached to said device; a spring exerting a force between the upper end of said second holding means and said device for causing said second holding means to move away from said first holding means upon breaking of said shear pin.

References Cited in the file of this patent

UNITED STATES PATENTS

| | | |
|---|---|---|
| 2,665,128 | Guffey | Jan. 5, 1954 |
| 2,675,202 | Kaemmerling | Apr. 13, 1954 |
| 2,783,841 | Dargols | Mar. 5, 1957 |
| 2,968,458 | Moeller | Jan. 17, 1961 |